Patented Oct. 31, 1933

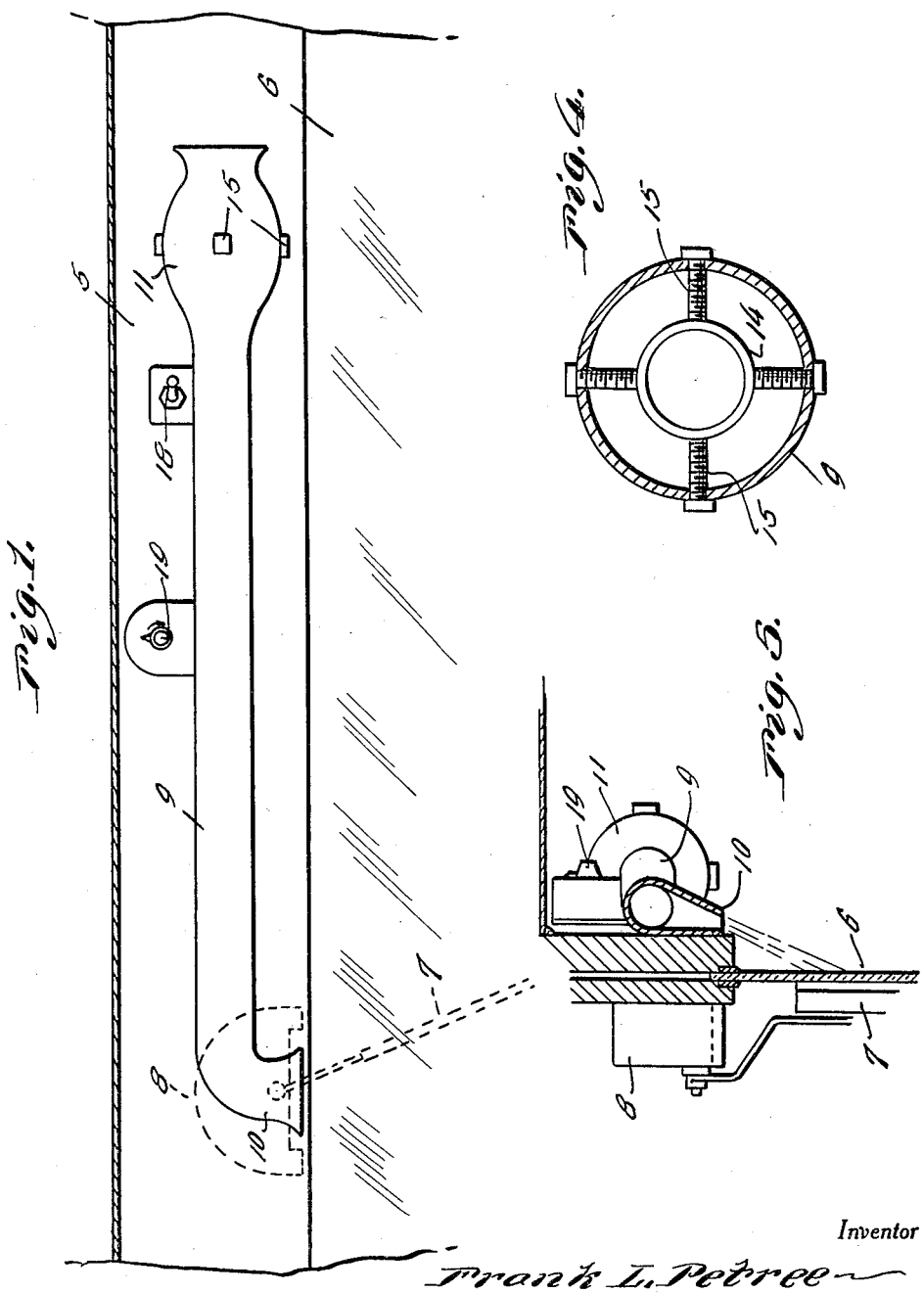

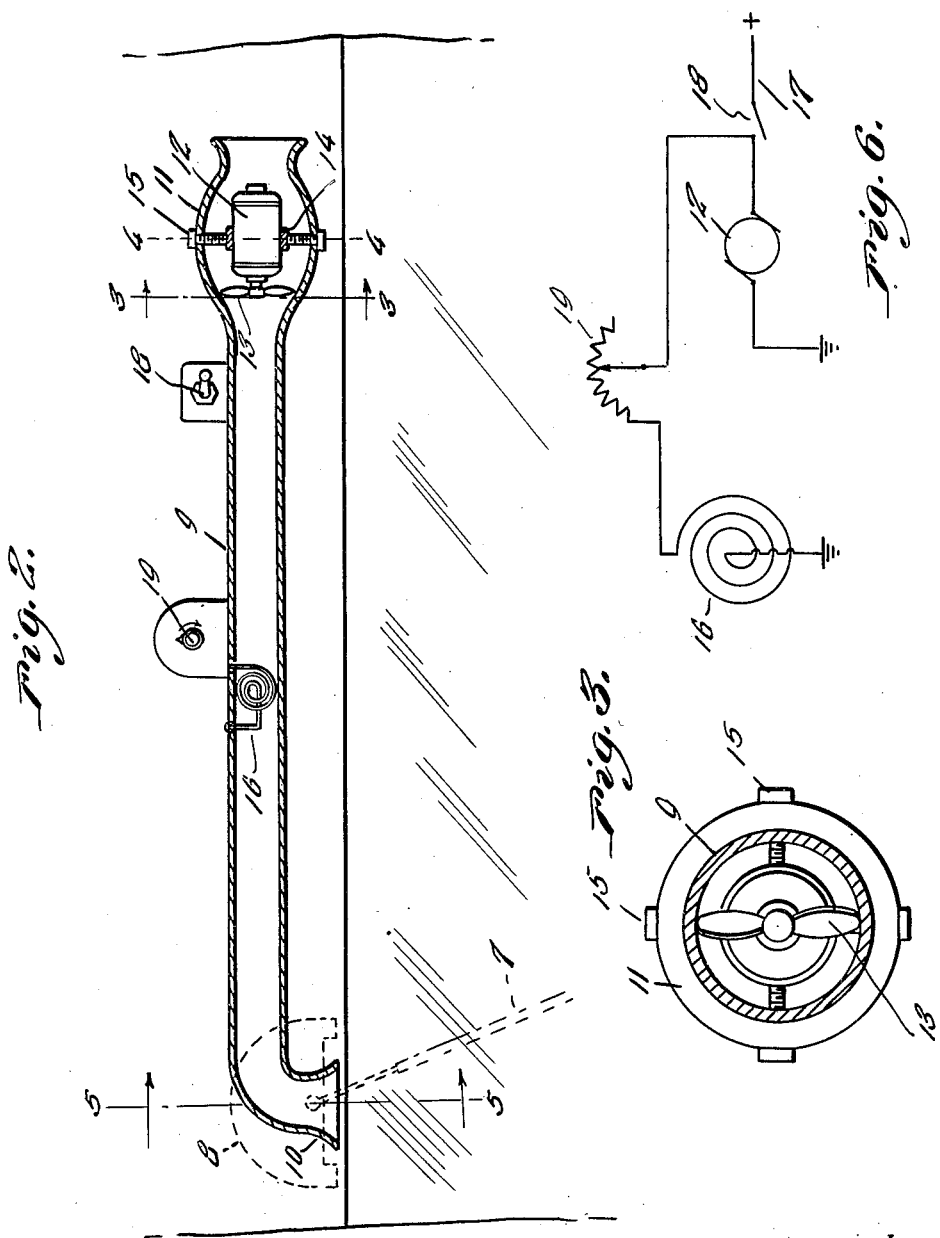

1,933,220

UNITED STATES PATENT OFFICE 1,933,220

ELECTRICAL WINDSHIELD HEATER

Frank L. Petree, Lewisville, N. C.

Application March 27, 1931. Serial No. 525,780

1 Claim. (Cl. 219—19)

This invention appertains to new and useful improvements in windshield heaters, and more particularly to a novel form of electrical heater for automobile windshields.

The principal object of this invention is to provide a windshield heater which can be readily mounted on an automobile body of conventional construction.

Another important object of the invention is to provide an automobile windshield heater of simple construction and low cost to manufacture.

Other important objects and advantages of the invention will become apparent to the reader of the following specification.

In the drawings:—

Figure 1 represents a fragmentary sectional view through an automobile body showing the device in front elevation.

Fig. 2 represents a longitudinal sectional view through the invention.

Fig. 3 represents a cross sectional view taken substantially on line 3—3 of Fig. 2.

Fig. 4 represents a cross sectional view taken substantially on the line 4—4 of Fig. 2.

Fig. 5 represents a fragmentary detailed sectional view taken substantially on the line 5—5 of Fig. 2.

Fig. 6 represents a diagrammatic view disclosing the electrical connections between the electrical devices involved.

Referring to the drawings wherein like numerals designate like parts, it can be seen that numeral 5 represents the upper portion of the windshield frame, while numeral 6 represents the windshield pane, and numeral 7 represents the usual windshield wiper wiping against the outer side of the windshield pane 6 and driven by the motor 8.

In carrying out the present invention, an elongated tube 9 is provided at one end with a downwardly extending and flared end portion 10 terminating immediately above that portion of the windshield pane which is ordinarily wiped on the forward side by the wiper 7. As shown in Fig. 1, this device is on the inside of the windshield and consequently the heating action is against the inside of the pane 6.

The opposite end of the tube 9 is enlarged as at 11 to accommodate the electric motor 12, which is preferably of small size and provided with a blower fan 13 on one end of an armature shaft.

To support this motor 12 within the enlarged portion 11 of the tube 9, a band 14 is disposed around the motor and engaged by the screws 15 which are threaded through the wall of the tube 9 and bear against the band 14, at substantially equal spaced intervals.

A heating element 16 is mounted within the tube 9 and at a point between the motor 12 and the flared end portion 10.

As is clearly shown in Fig. 6, a lead 17 extends from a suitable source of current to the switch 18 and from the switch 18 to the motor 12, and to the heating element 16 through the rheostat 19.

Obviously, when the switch 18 is turned on, both the motor 12 and heating element 16 will be energized, and as is apparent, the heating element 16 can be controlled by the rheostat 19.

When the heating element 16 is energized, and the fan 13 is operating, air is drawn through the adjacent end of the tube 9 and force passed through the heating element 16 and out through the flared end portion 10 of the tube, to impinge against the inner side of the pane 6 and the area thereof, maintained wiped at its front side by the wiper 7.

While the foregoing specification sets forth the invention in specific terms, it is to be understood that numerous changes in the shape, size and materials may be resorted to without departing from the spirit and scope of the invention as claimed hereinafter.

Having thus described my invention, what I claim as new is:—

In a heater for windshields, a tube having an air inlet at one end and an air outlet at its opposite end, a heating element, a rheostat mounted upon the tube, said tube having an opening therein, said heating element being located in the tube and having one end grounded to the tube and its opposite end extending through the opening to the rheostat, and a source of electricity connected to the said rheostat.

FRANK L. PETREE.